(12) United States Patent
Lampe et al.

(10) Patent No.: US 9,375,033 B2
(45) Date of Patent: Jun. 28, 2016

(54) TOBACCO-CONTAINING GEL COMPOSITION

(71) Applicant: R.J. Reynolds Tobacco Company, Winston-Salem, NC (US)

(72) Inventors: Matthew Lampe, Winston-Salem, NC (US); Donna Walker Duggins, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 3 days.

(21) Appl. No.: 14/180,710

(22) Filed: Feb. 14, 2014

(65) Prior Publication Data

US 2015/0230515 A1     Aug. 20, 2015

(51) Int. Cl.
*A24B 13/00* (2006.01)
*A24B 15/10* (2006.01)

(52) U.S. Cl.
CPC .............. *A24B 13/00* (2013.01); *A24B 15/10* (2013.01)

(58) Field of Classification Search
USPC ............ 131/300, 310, 347, 352; 424/48, 400, 424/435, 751
See application file for complete search history.

(56) References Cited

U.S. PATENT DOCUMENTS

| | | | |
|---|---|---|---|
| 3,806,617 A | 4/1974 | Smylie et al. | |
| 4,148,325 A | 4/1979 | Solomon et al. | |
| 4,317,837 A | 3/1982 | Kehoe et al. | |
| 4,725,440 A | 2/1988 | Ridgway et al. | |
| 4,806,356 A | 2/1989 | Shaw | |
| 4,880,018 A | 11/1989 | Graves, Jr. et al. | |
| 5,075,291 A | 12/1991 | DuRoss | |
| 5,098,730 A | 3/1992 | Pepper et al. | |
| 5,525,351 A | 6/1996 | Dam | |
| 5,733,574 A | 3/1998 | Dam | |
| 6,077,524 A | 6/2000 | Bolder et al. | |
| 6,083,531 A | 7/2000 | Humbert-Droz et al. | |

(Continued)

FOREIGN PATENT DOCUMENTS

CN     101233890     8/2008

OTHER PUBLICATIONS

"How to Make Homemade Salt Water Taffy" (Half Moon Bay Saltwater Taffy Company), 2014, [online], retrieved from eht Internet, [retrieved Jul. 23, 2015], <URL: http://www.halfmoonbaytaffy.com/blogs/news/13357397-how-to-make-homemade-salt-water-taffy>.*

(Continued)

*Primary Examiner* — Dennis Cordray
(74) *Attorney, Agent, or Firm* — Womble, Carlyle Sandridge & Rice, LLP (57) ABSTRACT

A smokeless tobacco gel product is providing, including a tobacco material in an amount of at least about 0.01 weight percent, based on the total weight of the smokeless tobacco gel product; at least about 50 percent by weight of one or more sugar alcohols; a humectant in an amount of at least about 0.1 weight percent; and water in an amount of at least about 10 weight percent. The tobacco material (e.g., particulate tobacco or a tobacco extract such as tobacco-derived nicotine) can be present in an amount of about 0.1 to about 10 weight percent. The humectant amount can be varied to vary the properties of the gel product, with more paste-like consistency achieved with a humectant amount of at least about 7 weight percent, and more syrup-like consistency achieved with a humectant amount of less than about 6 weight percent.

36 Claims, 1 Drawing Sheet

(56) References Cited

U.S. PATENT DOCUMENTS

| | | | |
|---|---|---|---|
| 6,110,495 | A | 8/2000 | Dam |
| 6,187,342 | B1 | 2/2001 | Zeidler et al. |
| 6,221,392 | B1 | 4/2001 | Khankari et al. |
| 6,510,855 | B1 | 1/2003 | Korte et al. |
| 6,669,879 | B1 | 12/2003 | Spengler et al. |
| 6,676,959 | B1 | 1/2004 | Andersson et al. |
| 6,787,157 | B1 | 9/2004 | Rosenberg et al. |
| 6,834,654 | B2 | 12/2004 | Williams |
| 6,849,286 | B1 | 2/2005 | Bayerköhler et al. |
| 6,872,405 | B2 | 3/2005 | Takaishi et al. |
| 7,122,198 | B1 | 10/2006 | Singh et al. |
| 7,914,811 | B2 | 3/2011 | Bunick et al. |
| 7,935,362 | B2 | 5/2011 | Ream et al. |
| 8,336,557 | B2 * | 12/2012 | Kumar et al. ............... 131/111 |
| 8,343,532 | B2 | 1/2013 | Dam et al. |
| 8,470,347 | B2 | 6/2013 | Berndl et al. |
| 8,470,366 | B2 | 6/2013 | Thakkar |
| 2003/0232082 | A1 | 12/2003 | Li et al. |
| 2004/0052851 | A1 | 3/2004 | Graff et al. |
| 2004/0076665 | A1 | 4/2004 | Graff et al. |
| 2004/0101543 | A1 | 5/2004 | Liu et al. |
| 2004/0253307 | A1 | 12/2004 | Hague et al. |
| 2005/0037068 | A1 | 2/2005 | Massironi |
| 2005/0244521 | A1 | 11/2005 | Strickland et al. |
| 2006/0171994 | A1 | 8/2006 | Dupinay et al. |
| 2006/0191548 | A1 | 8/2006 | Strickland et al. |
| 2006/0280777 | A1 | 12/2006 | Schydlowsky |
| 2007/0062549 | A1 | 3/2007 | Holton, Jr. et al. |
| 2007/0186941 | A1 | 8/2007 | Holton, Jr. et al. |
| 2007/0269386 | A1 | 11/2007 | Steen et al. |
| 2007/0269492 | A1 | 11/2007 | Steen et al. |
| 2008/0286340 | A1 | 11/2008 | Andersson et al. |
| 2010/0291245 | A1 | 11/2010 | Gao et al. |
| 2010/0300463 | A1 | 12/2010 | Chen et al. |
| 2011/0200670 | A1 | 8/2011 | Thakkar |
| 2012/0037175 | A1 * | 2/2012 | Cantrell ............... A23G 3/40 131/353 |
| 2012/0055494 | A1 | 3/2012 | Hunt et al. |
| 2012/0118310 | A1 * | 5/2012 | Cantrell ............... A23G 1/48 131/356 |
| 2012/0138074 | A1 | 6/2012 | Cantrell et al. |
| 2012/0199145 | A1 | 8/2012 | Byrd et al. |
| 2013/0078307 | A1 | 3/2013 | Holton, Jr. et al. |
| 2013/0085165 | A1 | 4/2013 | Dam et al. |
| 2013/0087946 | A1 | 4/2013 | Dam et al. |
| 2013/0206150 | A1 | 8/2013 | Duggins et al. |
| 2013/0209540 | A1 * | 8/2013 | Duggins et al. ............... 424/439 |

OTHER PUBLICATIONS

Djordjevic et al, "Nicotine Content and Delivery Across Tobacco Products",Handbook of Experimental Pharmacology 192, Nat. Health Inst., 2009, pp. 61-64.[online], retrieved from the Internet, [retrieved Jul. 24, 2015],<URL: http://download.springer.com/static/pdf/92/bok°/0253A978-3-540-69248-5.pdf?originUrl=http%3A%2F%2Flink.springer.com%2Fbook%F10.1007%.*

* cited by examiner

TOBACCO-CONTAINING GEL COMPOSITION

FIELD OF THE INVENTION

The present invention relates to products made or derived from tobacco, or that otherwise incorporate tobacco or components of tobacco, and are intended for human consumption.

BACKGROUND OF THE INVENTION

Cigarettes, cigars and pipes are popular smoking articles that employ tobacco in various forms. For example, a traditional type of cigarette has a substantially cylindrical rod-shaped structure and includes a charge, roll or column of smokable material, such as shredded tobacco (e.g., in cut filler form), surrounded by a paper wrapper, thereby forming a so-called "smokable rod", "tobacco rod" or "cigarette rod." Tobacco also may be enjoyed in a so-called smokeless form. Particularly popular smokeless tobacco products are employed by inserting some form of processed tobacco or tobacco-containing formulation into the mouth of the user. See for example, the types of representative smokeless tobacco products, as well as the various smokeless tobacco formulations, ingredients and processing methodologies, referenced in the background art set forth in U.S. Pat. Pub. Nos. 2011/0303511 to Brinkley et al. and 2013/0206150 to Duggins et al.; which are incorporated herein by reference.

It would be desirable to provide an enjoyable form of a tobacco product, such as a smokeless tobacco product, and to provide processes for preparing tobacco-containing compositions suitable for use in smokeless tobacco products.

SUMMARY OF THE INVENTION

The present disclosure relates to a dissolvable smokeless tobacco product configured for insertion into the mouth of a user and processes for preparing a smokeless tobacco composition suitable for use in a smokeless tobacco product. The smokeless tobacco composition of the disclosure provides a dissolvable smokeless tobacco gel product having a gel-type texture. The composition of the smokeless tobacco gel products disclosed herein can vary, giving products having a range of textures and other physical properties, such as paste-like or syrup-like properties.

In one aspect, the invention provides a smokeless tobacco gel product comprising: a tobacco material in an amount of at least about 0.01 weight percent, based on the total weight of the smokeless tobacco gel product; at least about 50 percent by weight of one or more sugar alcohols; a humectant in an amount of at least about 0.1 weight percent; and water in an amount of at least about 10 weight percent. In certain embodiments, the tobacco material (e.g., particulate tobacco or a tobacco extract such as tobacco-derived nicotine) is present in an amount of about 0.1 to about 10 weight percent.

The smokeless tobacco gel product of claim will often include at least about 60 percent by weight of the one or more sugar alcohols, such as at least about 65 percent by weight of the one or more sugar alcohols. Exemplary sugar alcohols include erythritol, threitol, arabitol, xylitol, ribotol, mannitol, sorbitol, dulcitol, iditol, isomalt, maltitol, lactitol, polyglycitol, and combinations thereof. In certain embodiments, the products include isomalt as the predominate sugar alcohol component, such as in combination with one or more of maltitol, sorbitol, erythritol, or xylitol. In some embodiments, the isomalt comprises at least about 50% of the total dry weight of sugar alcohols, such as at least about 60% of the total dry weight of sugar alcohols.

The humectant can be present in an amount of at least about 1.0 weight percent in some embodiments. An exemplary humectant is glycerin. In one embodiment, the humectant is present in an amount of at least about 7 weight percent, such as in certain smokeless tobacco gels having a paste-like consistency. In another embodiment, the humectant is present in an amount of less than about 6 weight percent, such as in certain smokeless tobacco gels having a syrup consistency.

The water content of the gel products can vary, but is typically greater than about 14 weight percent water. In one embodiment, the water is present in an amount of about 15 to about 40 weight percent water.

Other ingredients can be added to the smokeless tobacco gel product, such as sweeteners, salts, buffering agents, pH adjusters, colorants, flavorants, and combinations thereof. In certain embodiments, the gel product is translucent. Various embodiments of the gel product can be characterized as having syrup-like, jelly-like, gelatin-like, paste-like, or taffy-like texture. In some embodiments, the gel products exhibit a residence time in a user's mouth of between about 1 and about 10 minutes before complete dissolution of the product.

In one particular embodiment, the smokeless tobacco gel product includes about 0.05 to about 0.5 percent by weight of nicotine; about 55 to about 80 percent by weight of one or more sugar alcohols; about 1 weight percent to about 20 percent by weight of a humectant; and about 15 to about 40 percent by weight of water. Optionally, the product can further include one or more of the following: about 0.001 to about 0.1 percent by weight of one or more sweeteners; up to about 2 percent of one or more flavorants; and up to about 2 percent by weight of a salt.

The smokeless tobacco gel products can optionally further comprise an edible coating. For example, the edible coating may comprise a soft-shell coating, gel coating, or hard-shell coating. The makeup of the edible coating can vary. In certain embodiments, the edible coating can comprise a second tobacco material. For example, in some embodiments, the edible coating comprises at least about 50 percent by dry weight of one or more sugar alcohols or at least about 80 percent by dry weight of one or more sugar alcohols. In some embodiments, the one or more sugar alcohols of the edible coating can comprise sugar alcohols selected from the group consisting of isomalt, maltitol, sorbitol, and combinations thereof. Various other components may be included in the edible coatings described herein, including but not limited to, ingredients selected from the group consisting of a film-forming polymer, sweetener, salt, humectant, buffering agent, pH adjuster, colorant, flavorant, and combinations thereof.

In another aspect, a method of preparing a smokeless tobacco gel product is provided comprising: mixing one or more sugar alcohols with a humectant and a tobacco material to form a gel mixture; and depositing the gel mixture into an airtight container or encapsulating the gel mixture with a coating composition to prevent hardening of the gel mixture in the presence of air. Heat can be applied during the mixing step (at any point and not necessarily during the entire duration of mixing) at a temperature below the hard crack stage of the one or more sugar alcohols. For more paste-like texture, the method can further include aerating the gel mixture.

The method of encapsulating can include dipping the gel mixture in a coating composition; spraying a coating composition onto the gel mixture; or preparing a coating composition in the form of a sheet and enclosing the gel mixture between two sheets of the coating composition.

Depositing the gel mixture into an airtight container can comprise depositing the gel mixture into a container comprising a dispensing mechanism adapted for urging the gel mixture toward an opening when manipulated by a consumer. Alternatively, the depositing step can include depositing the gel mixture into an air-impermeable pouch or straw, the pouch or straw including at least one heat-sealed or recloseable end.

BRIEF DESCRIPTION OF THE DRAWINGS

In order to assist the understanding of embodiments of the invention, reference will now be made to the appended drawings, which are not necessarily drawn to scale. The drawings are exemplary only, and should not be construed as limiting the invention.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

The present invention provides novel nicotine- and/or tobacco-containing products, suitable for use as oral formulations. Certain gels of the present disclosure typically include at least one tobacco material (e.g., a particulate tobacco material or tobacco-derived extract), one or more sugar alcohols, and a humectant.

The products described herein are generally dissolvable oral gel products. In some embodiments, the oral gel products can be described as "hard gels" or "soft gels." By the term "gel" as used herein is intended a solid, semi-solid, or viscous liquid material that is pliable and/or flowable to some extent. The rigidity, texture, consistency, viscosity, and rheological properties of gels according to the invention can vary. For example, certain embodiments of the gels of the invention can be characterized as thixotropic. Additional embodiments can be characterized as thick and syrup-like. Certain embodiments can be characterized as having physical properties similar to gelatin, jelly, paste, glue, taffy, honey, or the like. Accordingly, gels can have varying levels of firmness, springiness, gumminess, tackiness, flowability, etc. As used herein, the terms "dissolve," "dissolving," and "dissolvable" refer to compositions having aqueous-soluble components that interact with moisture in the oral cavity and enter into solution, thereby causing gradual consumption of the product. The products of the disclosure typically do not exhibit a highly deformable chewing quality as found in conventional chewing gum.

In certain embodiments of the invention, a gel having syrup-like properties is provided, such as a gel exhibiting flowability and tackiness similar to honey. In other embodiments, the invention provides a gel having properties associated with a paste, such a gel exhibiting viscosity and texture similar to toothpaste.

The above-noted properties of the gels of the invention can be varied by adjusting the composition. For example, adjusting the water content of the gel formulation can result in adjustment of certain gel properties. Still further, adjustment of the amount of humectant, such as glycerin, can change the properties of the resulting gel. In addition, the presence or absence of certain binders can affect many of the above-noted properties of the gel.

The products of the disclosure will typically incorporate some form of a plant of the *Nicotiana* species, and most preferably, those compositions or products incorporate some form of tobacco. The selection of the plant from the *Nicotiana* species can vary; and in particular, the types of tobacco or tobaccos may vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and *Rustica* tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. *Nicotiana* species can be derived using genetic-modification or cross-breeding techniques (e.g., tobacco plants can be genetically engineered or crossbred to increase or decrease production of or to other change certain components, characteristics or attributes). Additional information on types of *Nicotiana* species suitable for use in the present invention can be found in US Pat. Appl. Pub. No. 2012/0192880 to Dube et al., which is incorporated by reference herein. Tobacco plants can be grown in greenhouses, growth chambers, or outdoors in fields, or grown hydroponically.

The portion or portions of the plant of the *Nicotiana* species used according to the present invention can vary. For example, virtually all of the plant (e.g., the whole plant) can be harvested, and employed as such. Alternatively, various parts or pieces of the plant can be harvested or separated for further use after harvest. For example, the leaves, stem, stalk, roots, lamina, flowers, seed, and various portions and combinations thereof, can be isolated for further use or treatment. The plant material of the invention may thus comprise an entire plant or any portion of a plant of the *Nicotiana* species. See, for example, the portions of tobacco plants set forth in US Pat. Appl. Pub. Nos. 2011/0174323 to Coleman, III et al. and 2012/0192880 to Dube et al., which are incorporated by reference herein.

The plant of the *Nicotiana* species can be employed in either an immature or mature form, and can be used in either a green form or a cured form, as described in 2012/0192880 to Dube et al., which is incorporated by reference herein.

The tobacco material can be subjected to various treatment processes such as, refrigeration, freezing, drying (e.g., freeze-drying or spray-drying), irradiation, yellowing, heating, cooking (e.g., roasting, frying or boiling), fermentation, bleaching, or otherwise subjected to storage or treatment for later use. Exemplary processing techniques are described, for example, in US Pat. Appl. Pub. Nos. 2009/0025739 to Brinkley et al. and 2011/0174323 to Coleman, III et al., which are incorporated by reference herein.

Tobacco materials can be treated with enzymes and/or probiotics before or after harvest, as discussed in US Pat.

Appl. Pub. Nos. 2013/0269719 Marshall et al. and 2014/0020694 to Moldoveanu, which are incorporated herein by reference. Tobacco materials may be irradiated, pasteurized, or otherwise subjected to controlled heat treatment. Representative processes are set forth in US Pat. Pub. Nos. 2009/0025738 to Mua et al.; 2009/0025739 to Brinkley et al.; and 2011/0247640 to Beeson et al., which are incorporated herein by reference. In one embodiment, the tobacco material is heat treated in the presence of water, NaOH, and an additive (e.g., lysine) at about 88° C. for about 60 minutes. Such heat treatment can help prevent acrylamide production resulting from reaction of asparagine with reducing sugars in tobacco materials and can provide some degree of pasteurization. See, for example, US Pat. Pub. No. 2010/0300463 to Chen et al., which is incorporated herein by reference. The tobacco material can be brought into contact with an imprinted polymer or non-imprinted polymer such as described, for example, in US Pat. Pub. Nos. 2007/0186940 to Bhattacharyya et al; 2011/0041859 to Rees et al.; 2011/0159160 to Jonsson et al; and 2012/0291793 to Byrd et al., all of which are incorporated herein by reference.

A harvested portion or portions of the plant of the *Nicotiana* species can be physically processed. A portion or portions of the plant can be separated into individual parts or pieces (e.g., roots can be removed from stalks, stems can be removed from stalks, leaves can be removed from stalks and/or stems, petals can be removed from the remaining portion of the flower). The harvested portion or portions of the plant can be further subdivided into parts or pieces (e.g., shredded, cut, comminuted, pulverized, milled or ground into pieces or parts that can be characterized as filler-type pieces, granules, particulates or fine powders). The harvested portion or portions of the plant can be subjected to external forces or pressure (e.g., by being pressed or subjected to roll treatment). When carrying out such processing conditions, the harvested portion or portions of the plant can have a moisture content that approximates its natural moisture content (e.g., its moisture content immediately upon harvest), a moisture content achieved by adding moisture to the harvested portion or portions of the plant, or a moisture content that results from the drying of the harvested portion or portions of the plant.

In certain embodiments, the tobacco material is used in a form that can be described as particulate (i.e., shredded, ground, granulated, or powder form). The manner by which the tobacco material is provided in a finely divided or powder type of form may vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like. For example, tobacco parts or pieces may be ground or milled when the moisture content thereof is less than about 15 weight percent or less than about 5 weight percent. Most preferably, the tobacco material is employed in the form of parts or pieces that have an average particle size less than about 50 microns. In one embodiment, the average particle size of the tobacco particles may be less than or equal to about 25 microns. In some instances, the tobacco particles may be sized to pass through a screen mesh. If desired, air classification equipment may be used to ensure that small sized tobacco particles of the desired sizes, or range of sizes, may be collected. If desired, differently sized pieces of granulated tobacco may be mixed together. Use of micro-milled tobacco particles (or other micro-sized botanical components) can be advantageous where the user prefers to reduce or eliminate product waste after use.

In certain embodiments, at least a portion of the tobacco material employed in the tobacco composition or product can have the form of an extract. Tobacco extracts can be obtained by extracting tobacco using a solvent having an aqueous character such as distilled water or tap water. As such, aqueous tobacco extracts can be provided by extracting tobacco with water, such that water insoluble pulp material is separated from the aqueous solvent and the water soluble and dispersible tobacco components dissolved and dispersed therein. Exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,284,875 to Turpen et al.; U.S. Pat. No. 6,298,859 to Kierulff et al.; U.S. Pat. No. 6,772,767 to Mua et al.; U.S. Pat. No. 6,817,970 to Berit et al.; U.S. Pat. No. 6,906,172 to Bratcher et al.; U.S. Pat. No. 7,034,128 to Turpen et al.; U.S. Pat. No. 7,048,211 to Bratcher et al.; and U.S. Pat. No. 7,337,782 to Thompson, all of which are incorporated by reference herein. See also, the ultrafiltered translucent tobacco extracts set forth in US Pat. Appl. Pub. Nos. 2013/0074855 and 2013/0074856, both to Holton, Jr., which are incorporated by reference herein.

The tobacco-derived extract will typically comprise a mixture of desired components isolated from a plant of the *Nicotiana* species by various means. However, if desired, the tobacco-derived extract can be highly purified with respect to a single component of the extract or a small number of extract components. Typical separation processes that can further purify or isolate components of a tobacco extract include one or more process steps such as solvent extraction (e.g., using polar solvents, organic solvents, or supercritical fluids), chromatography (e.g., preparative liquid chromatography), clarification, distillation, filtration (e.g., ultrafiltration), recrystallization, and/or solvent-solvent partitioning. In some embodiments, a plant or a portion thereof is pre-treated, e.g., to liberate certain compounds to make the desired compounds available for more efficient separation. In some embodiments, multiple methods are used to isolate and/or purify the desired compounds. See, for example, the description of isolated tobacco components and techniques for isolation in US Pat. Appl. Pub. Nos. 2011/0174323 to Coleman, III et al.; 2011/0259353 to Coleman, III et al.; 2012/0192880 to Dube et al.; 2012/0192882 to Dube et al.; and 2012/0211016 to Byrd, Jr. et al., which are incorporated by reference herein.

Tobacco extracts used in the smokeless tobacco gel products of the present disclosure can, in some embodiments, be characterized as translucent or transparent. In certain embodiments, such extracts can be characterized by the molecular weight of their components. For example, a translucent tobacco extract can consist of compounds having a molecular weight of less than about 50,000 Da., or compounds having a molecular weight of less than about 5,000 Da. The translucency of a tobacco extract can be characterized by a percent light transmittance (compared to water at 100% transmittance), such as a percent light transmittance of at least about 30% at visible light wavelengths greater than about 600 nm, or a percent light transmittance of at least about 40% at visible light wavelengths greater than about 600 nm, or a percent light transmittance of at least about 50% at visible light wavelengths greater than about 600 nm (or even higher levels such as greater than about 60% or greater than about 70% or greater than about 80% at visible light wavelengths greater than about 600 nm).

Reference to "tobacco extract" as explained above encompasses extracts highly purified with respect to one or a few components thereof. For example, highly purified tobacco-derived nicotine (e.g., pharmaceutical grade nicotine having a purity of greater than 98% or greater than 99%) or a derivative thereof can be used in the present invention. Representative nicotine-containing extracts can be provided using the techniques set forth in U.S. Pat. No. 5,159,942 to Brinkley et al., which is incorporated herein by reference. Extracts containing relatively high nicotine content can be buffered, e.g., using buffering agents such as citric acid to lower the pH of the extracts.

The form of the tobacco extract (or isolate therefrom) obtained according to the present invention can vary. Typically, the isolate is in a solid, liquid, or semi-solid form. The formulation can be used in concrete, absolute, or neat form. Solid forms of the tobacco isolate can include spray-dried and freeze-dried forms (e.g., freeze-dried flue cured extract or spray-dried fire-cured extract). Liquid forms of the tobacco isolate can include formulations contained within aqueous or organic solvent carriers.

In certain embodiments, the gel of the invention can include nicotine in any form from any source, whether tobacco-derived or synthetically-derived. Normally, nicotinic compounds used in the present invention are selected from the group consisting of nicotine base, nicotine hydrochloride, nicotine dihydrochloride, nicotine monotartrate, nicotine bitartrate, nicotine sulfate, nicotine zinc chloride such as nicotine zinc chloride monohydrate and nicotine salicylate. In some embodiments, nicotine is in its free base form, which can optionally be sorbed on a carrier (e.g., microcrystalline cellulose) for inclusion in a smokeless tobacco product. See, for example, the nicotine/carrier compositions set forth in US Pat. Pub. No. 2004/0191322 to Hansson, which is incorporated by reference herein.

The relative amount of tobacco material within the smokeless tobacco composition may vary, and depends in part on the type of tobacco material employed (e.g., milled tobacco or tobacco extract). Preferably, the total amount of tobacco material (from any source including tobacco extracts or isolates and particulate tobacco material) formulation within the smokeless tobacco gel is between about 0.01 and about 40 weight percent based on total weight of the composition, more typically between about 0.2 and about 20 weight percent (e.g., between about 0.3 and about 10 weight percent). For embodiments containing only tobacco extract as the tobacco component (including pharmaceutical grade nicotine), the gel will typically contain no more than about 10 weight percent of tobacco component, such as no more than about 8 weight percent, no more than about 5 weight percent, or no more than about 3 weight percent (e.g., about 0.01 to about 10 weight percent). For embodiments containing a particulate tobacco component (e.g., a finely milled tobacco), either as the sole tobacco component or in combination with a tobacco extract, the gel will typically contain no more than about 20 weight percent of tobacco component, such as no more than about 15 weight percent, no more than about 10 weight percent, or no more than about 8 weight percent (e.g., about 1 to about 12 weight percent). The amount of tobacco material (or combination of tobacco material with other botanical components) will typically not exceed 50 weight percent.

In addition to (or in lieu of in certain embodiments) the above-noted tobacco material, products of the invention can include a further non-tobacco botanical material. As used herein, the term "botanical material" refers to any plant material, including plant material in its natural form and plant material derived from natural plant materials, such as extracts or isolates from plant materials or treated plant materials (e.g., plant materials subjected to heat treatment, fermentation, or other treatment processes capable of altering the chemical nature of the material). For the purposes of the present disclosure, a "botanical material" includes but is not limited to "herbal materials," which refer to seed-producing plants that do not develop persistent woody tissue and are often valued for their medicinal or sensory characteristics (e.g., teas or tisanes). Certain botanical materials of this type are sometimes referred to as dietary supplements, nutraceuticals, "phytochemicals" or "functional foods." Exemplary botanical materials, many of which are associated with antioxidant characteristics, include without limitation acai berry, alfalfa, allspice, annatto seed, apricot oil, basil, bee balm, wild bergamot, black pepper, blueberries, borage seed oil, bugleweed, cacao, calamus root, catnip, catuaba, cayenne pepper, chaga mushroom, chervil, cinnamon, dark chocolate, potato peel, grape seed, ginseng, gingko biloba, Saint John's Wort, saw palmetto, green tea, black tea, black cohosh, cayenne, chamomile, cloves, cocoa powder, cranberry, dandelion, grapefruit, honeybush, echinacea, garlic, evening primrose, feverfew, ginger, goldenseal, hawthorn, hibiscus flower, jiaogulan, kava, lavender, licorice, marjoram, milk thistle, mints (menthe), oolong tea, beet root, orange, oregano, papaya, pennyroyal, peppermint, red clover, rooibos (red or green), rosehip, rosemary, sage, clary sage, savory, spearmint, spirulina, slippery elm bark, sorghum bran hi-tannin, sorghum grain hi-tannin, sumac bran, comfrey leaf and root, goji berries, gutu kola, thyme, turmeric, uva ursi, valerian, wild yam root, wintergreen, yacon root, yellow dock, yerba mate, yerba santa, bacopa monniera, withania somnifera, and silybum marianum. When present in the composition, such botanical materials can be used in the same forms noted above with respect to tobacco (e.g., milled particulates or extracts) and the amounts utilized are typically such that the total tobacco and non-tobacco botanical material falls within the total amounts given above for tobacco materials in the compositions of the invention. In other words, the total content of tobacco and non-tobacco botanical materials will typically be between about 0.1 and about 40 weight percent based on total weight of the composition, more typically between about 0.2 and about 20 weight percent (e.g., between about 0.3 and about 12 weight percent). Most preferably, the non-tobacco botanical material is employed in the form of an aqueous extract (e.g., freeze-dried or spray-dried extracts) or in powder form (e.g., having an average particle size less than about 50 microns).

In certain embodiments, the non-tobacco botanical will provide advantageous sensory characteristics (e.g., taste, aroma, or color) or other functional benefits, such as function as a binder or filler. In certain embodiments, the non-tobacco botanical may be associated with desirable bioactivity or health-related effects such as antioxidant qualities. In particularly preferred embodiments, the non-tobacco botanical components will complement the sensory characteristics associated with tobacco-derived materials in the formulation, and in some cases, will even contribute tobacco-like sensory characteristics. In some embodiments, the presence of the non-tobacco botanical is associated with mouth and throat sensory characteristics that are not dissonant with the overall desirable sensory characteristics of the product and, in some cases, can contribute to a reduction in mouth and/or throat irritation otherwise associated with the formulation. Green tea (*Camellia sinesis*), guayusa, rooibos (particularly green rooibos) and honeybush (particularly red honeybush) are particularly advantageous non-tobacco botanical components that can lead to the desirable characteristics set forth above.

Honeybush (genus *Cyclopia*) is a flowering plant in the legume family named for the honey-like aroma of its flowers. The honeybush plant is unique to South Africa and exemplary species include *Cyclopia genistoides, Cyclopia longifolia, Cyclopia maculata, Cyclopia subternata*, and *Cyclopia intermedia*. The leaves of the honeybush plant are sometimes used in tisanes. The shoots (leaves and twigs) of the Honeybush plant are typically harvested and chopped or shredded. Thereafter, the plant material can be used as-is in "green" form, which is lighter in color and less sweet, or subjected to a fermenting process to produce "red" honeybush, which enhances the sweetness and produces a rich amber color. Honeybush in either form can be purchased from specialty tea distributors. The honeybush plant is rich in antioxidants, such as mangiferin, and is being studied for its possible cancer-protective benefits. See Kokotkiewicz, A & Luczkiewics, M. 2009. Honeybush (*Cyclopia* sp.)—A rich source of compounds with high antimutagenic properties. Fitoterapia 80 (2009) 3-11. In certain embodiments, honeybush is present in an amount of up to about 15 weight percent, such as about 1 to about 5 weight percent in aqueous extract form, or about 5 to about 10 weight percent in powder form.

Like honeybush, rooibos (*Aspalathus linearis*) is also a flowering plant in the legume family indigenous to South Africa, and its leaves are also used in tisanes. The rooibos plant is harvested and processed in a manner similar to honeybush described above, and is available in green or red (fermented) forms. Rooibos in either form can be purchased from specialty tea distributors. The rooibos plant is rich in antioxidants and is being studied for its possible health-protective benefits. See The Science Behind Rooibos—South Africa's Unique and Healthy Herbal Tea, South African Rooibos Council, July 2013. In certain embodiments, rooibos is present in an amount of up to about 15 weight percent, such as about 1 to about 5 weight percent in aqueous extract form, or about 5 to about 10 weight percent in powder form.

The smokeless tobacco compositions of the disclosure typically include at least one sugar alcohol and, often, the compositions of the invention contain a plurality of sugar alcohols. Sugar alcohols are polyols derived from monosaccharides or disaccharides that have a partially or fully hydrogenated form. Exemplary sugar alcohols have between about 4 and about 20 carbon atoms and include erythritol, arabitol, ribitol, isomalt, polyglycitol, maltitol, dulcitol, iditol, mannitol, xylitol, lactitol, sorbitol, and combinations thereof (e.g., hydrogenated starch hydrolysates). A sugar alcohol is typically added to compositions of the disclosure in the form of an aqueous solution or suspension, such as a solution or suspension with a solids content of about 50 to about 90 weight percent. Sugar alcohols can fulfill multiple functions, such as providing sweetness, enhancing certain organoleptic properties such as texture and mouthfeel, enhancing cohesiveness or compressibility of the product, and the like.

A combination of sugar alcohols is typically utilized in the present invention. The exact combination of sugar alcohols used in any given formulation can be selected based on a number of factors, including laxation threshold, relative sweetness, calorie content, glycemic index, degree of hygroscopicity, and the like. In the present invention, the predominant sugar alcohol component is typically isomalt, and isomalt is typically used in an amount of at least about 50% of the total dry weight of sugar alcohols, such as at least about 60%, or at least about 70%, or at least about 80% by dry weight. Exemplary weight percentages of isomalt as a percentage of total sugar alcohol dry weight is about 65 to about 85% (e.g., about 70 to about 85%).

The combination of sugar alcohols will also include at least one additional sugar alcohol, and in certain embodiments, will include at least two additional sugar alcohols. In certain embodiments, the additional sugar alcohols will comprise two additional sugar alcohols in a dry weight ratio of at least about 1.5:1, at least about 2:1, or at least about 2.5:1. Exemplary sugar alcohols useful as the larger component in the ratio include erythritol, maltitol or sorbitol. Examples of the minor component in the ratio include maltitol, sorbitol, erythritol, or xylitol.

The total sugar alcohol content of the gels of the invention will typically range from about 50 to about 90 weight percent based on total weight of the gel, such as about 60 to about 85 weight percent, or about 65 to about 80 weight percent. The sugar alcohol content of the gel will typically be at least about 50 weight percent, or at least about 55 weight percent, or at least about 60 weight percent. The sugar alcohol content of the gels will typically not exceed about 90 weight percent, such as no more than about 85 weight percent, or no more than about 80 weight percent.

A humectant (e.g., glycerin or propylene glycol) may be employed in amounts sufficient to provide desired moisture attributes to the smokeless tobacco composition. Further, in some instances, the humectant may impart desirable flow characteristics to the smokeless tobacco composition. When present, a representative amount of humectant is at least about 0.1 weight percent or at least about 0.5 weight percent or at least about 1.0 weight percent, but will typically make up less than about 20 percent of the total weight of the composition (e.g., about 1 weight percent to about 20 weight percent, such as from about 2 weight percent to about 15 weight percent).

The amount of humectant can significantly affect the overall flowability and other properties of the gel. A gel having a paste-like consistency will typically have a larger amount of humectant, such as greater than about 7 weight percent, greater than about 8 weight percent, or greater than about 9 weight percent (e.g., about 8 to about 15 weight percent). A gel having a consistency similar to a syrup (e.g., honey) will typically contain less humectant, such as less than about 6 weight percent, less than about 5 weight percent or less than about 4 weight percent (e.g., about 2 to about 6 weight percent).

The gels of the invention will typically include a significant amount of water. The total water content in the gels of the invention will typically be greater than about 10 weight percent based on total weight of the gel formulation, such as greater than about 12 weight percent or greater than about 14 weight percent. The water content of the gels of the invention will typically not exceed about 45 weight percent, such as less than about 40 weight percent or less than about 35 weight percent. Gels having a more paste-like consistency will typically have a higher water content (e.g., about 25 to about 40 weight percent), while gels having a more syrup-like gel structure will typically have a lower water content (e.g., about 15 to about 25 weight percent).

The tobacco material (and/or botanical material) formulation used for the manufacture of the smokeless tobacco gel product can be processed, blended, formulated, combined and mixed with other materials or ingredients in addition to those components noted above. See, for example, those representative components, combination of components, relative amounts of those components and ingredients relative to tobacco, and manners and methods for employing those components, set forth in US Pat. Pub. Nos. 2007/0062549 to Holton, et al. and 2007/0186941 to Holton, et al., each of which is incorporated herein by reference.

Accordingly, gel smokeless tobacco products are provided herein that can further comprise one or more additional components. The additional components can be artificial, or can be obtained or derived from herbal or biological sources. Exemplary types of further components include salts (e.g., sodium chloride, potassium chloride, sodium citrate, potassium citrate, sodium acetate, potassium acetate, flour salt, and the like), natural sweeteners (e.g., fructose, sucrose, glucose, maltose, vanillin, ethylvanillin glucoside, mannose, galactose, lactose, stevia, and the like), artificial sweeteners (e.g., sucralose, sucrose, isomaltulose, saccharin, aspartame, acesulfame K, neotame and the like), organic and inorganic fillers (e.g., grains, processed grains, puffed grains, maltodextrin, dextrose, calcium carbonate, calcium phosphate, corn starch, lactose, finely divided cellulose, and the like), binders (e.g., povidone, sodium carboxymethylcellulose (CMC) and other modified cellulosic types of binders, sodium alginate, xanthan gum, starch-based binders, gum arabic, agar, gellan gum, polydextrose, and the like), gelling agents (e.g., fish gelatin, sorghum malt, or carrageenan), pH adjusters or buffering agents (e.g., metal hydroxides, preferably alkali metal hydroxides such as sodium hydroxide and potassium hydroxide, and other alkali metal buffers such as metal carbonates, preferably potassium carbonate or sodium carbonate, or metal bicarbonates such as sodium bicarbonate, and the like), emulsifiers, colorants (e.g., dyes and pigments, including caramel coloring, titanium dioxide, and the like), humectants (e.g., glycerin, and the like), effervescing materials such as certain acid/base combinations, lipids/oils (e.g., coconut oil, lecithin, such as sunflower lecithin, palm kernel oil, and palm oil), oral care components (e.g., thyme oil, eucalyptus oil, food-grade Aloe Vera gel, and zinc), preservatives (e.g., potassium sorbate and the like), syrups (e.g., honey, high fructose corn syrup, corn syrup, and the like), disintegration or compressibility aids (e.g., microcrystalline cellulose, croscarmellose sodium, crospovidone, sodium starch glycolate, pregelatinized corn starch, and the like), flavorant and flavoring mixtures, antioxidants, and mixtures thereof. Exemplary encapsulated components are described, for example, in WO 2010/132444 to Atchley, which is incorporated by reference herein. Other exemplary types of components may include those described in, for example, U.S. Pat. Pub. Nos. 2010/0291245 to Gao et al., 2012/0055494 to Hunt et al. and 2012/0199145 to Byrd et al., which are incorporated by reference herein.

Such components may be provided in a powder or granulated form for mixing with the tobacco material formulation, or otherwise may be provided in liquid form. Most preferably, additional components when provided in a powder or granulated form are employed in the form of parts or pieces that have an average particle size less than about 50 microns. According to some aspects, the average particle size of the components may be about 25 microns or less. The moisture content of the components provided in a powder or granulated form may vary. The particular percentages and choice of ingredients will vary depending upon the desired flavor, texture, and other characteristics.

As used herein, a "flavorant" or "flavoring agent" is any flavorful or aromatic substance capable of altering the sensory characteristics associated with the smokeless tobacco composition. Exemplary sensory characteristics that can be modified by the flavorant include, taste, mouthfeel, moistness, coolness/heat, and/or fragrance/aroma. The flavorants can be natural or synthetic, and the character of these flavors can be described as, without limitation, fresh, sweet, herbal, confectionary, floral, fruity or spice. Specific types of flavors include, but are not limited to, vanilla, coffee, chocolate, cream, mint (e.g., mint oil), spearmint, menthol, peppermint, wintergreen, lavender, cardamon, nutmeg, cinnamon, clove, cascarilla, sandalwood, honey, jasmine, ginger, anise, sage, licorice, lemon, orange, apple, peach, lime, cherry, and strawberry. Flavorants utilized in the disclosure also can include components that are considered moistening, cooling or smoothening agents, such as eucalyptus. These flavors may be provided neat (i.e., alone) or in a composite (e.g., spearmint and menthol or orange and cinnamon). In some instances, the flavorant may be provided in a spray-dried form or a liquid form. Flavorants are typically present in an amount of about 0.05 to about 5 weight percent, often about 0.1 to about 2 weight percent.

Sweeteners can be used in natural or artificial form or as a combination of artificial and natural sweeteners. In certain embodiments, the compositions can advantageously comprise sucralose as a sweetener. When present, a representative amount of sweetener, whether an artificial sweetener and/or natural sugar, may make up at least about 0.001 percent, at least about 0.01 percent, or at least about 0.1 percent of the total weight of the composition. Typical gel smokeless tobacco compositions described herein comprise less than about 10 percent, less than about 8 percent, less than about 5 percent, or less than about 2 percent sweetener by weight. An exemplary range of sweetener in the gel smokeless tobacco compositions of the present disclosure is between about 0.001 percent and about 1 percent by weight, e.g., between about 0.002 percent and about 0.5 percent by weight.

A salt (e.g., sodium chloride, flour salt) may be employed in amounts sufficient to provide desired sensory attributes to the smokeless tobacco composition. When present, a representative amount of salt is at least about 0.1 weight percent or at least about 0.2 weight percent, but will typically may make up less than about 5 percent of the total weight of the composition (e.g., about 0.1 to about 2 weight percent).

Preferred buffering agents buffer within a pH range of about 6 to about 10, and exemplary buffering agents include metal hydroxides (e.g., NaOH), metal carbonates, metal bicarbonates, or mixtures thereof. The buffering agent is typically present in an amount less than about 1 percent based on the weight of the formulation.

A binder (or combination of binders) or gelling agent may be employed in amounts sufficient to provide the desired physical attributes (e.g., gel-like properties) and physical integrity to the smokeless tobacco composition. In certain embodiments, a binder or gelling agent can be helpful to retard recrystallization of the sugar alcohol component of the gel. Exemplary binders or gelling agents include carrageenan and natural gums such as gum arabic. A representative amount of binder or gelling agent may make up at least about 5 percent or at least about 10 percent of the total weight of the composition. In certain embodiments, the binder component(s) of the composition will be present in an amount of at least about 20 weight percent, at least about 25 weight percent, at least about 30 weight percent, at least about 35 weight percent, or at least about 40 weight percent. Often, the amount of binder within a desirable composition will not exceed about 50 percent of the total weight of the composition. Accordingly, the total amount of binder in certain embodiments can range from about 5 percent to about 50 percent by weight (e.g., from about 10 percent to about 30 percent by weight, such as from about 15 percent to about 25 percent by weight).

In certain embodiments, the binder material includes a natural gum. As used herein, a natural gum refers to polysaccharide materials of natural origin that are useful as thickening or gelling agents. When present, natural gum binder materials are typically present in an amount of at least about 15 weight percent or at least about 20 weight percent or at least about 25 weight percent. Representative natural gums derived from plants, which are typically water soluble to some degree, include agar agar, xanthan gum, guar gum, gum arabic, ghatti gum, gum tragacanth, karaya gum, locust bean gum, gellan gum, and combinations thereof.

The lipid component in such gel compositions includes, but is not limited to, a fat, oil, or wax substance (or combination thereof). Exemplary fats that can be used include palm oil, palm kernel oil, soybean oil, cottonseed oil, and mixtures thereof. According to some aspects, the lipid substance may be hydrogenated, partially hydrogenated, or non-hydrogenated. In some instances, the lipid substance may include a blend of lipid components. For example, the lipid substance may include a blend of palm oil and palm kernel oil. Further information regarding lipid components is provided, for example, in US Pat. Pub. No. 2012/0037175 to Cantrell et al., which is incorporated by reference herein. The relative amount of lipid substance within the smokeless tobacco composition may vary. Where present, the lipid component can, in some embodiments, be present in an amount of at least about 5 percent or at least about 10 percent by weight based on total weight of gel formulation. Exemplary lipid weight ranges include about 1 to about 40 weight percent, more typically about 1 to about 30 weight percent.

The acidity or alkalinity of the smokeless tobacco product, which is often characterized in terms of pH, can vary and will depend, in part, on whether the product is formulated with a pH adjuster (e.g., citric acid) or buffering agent. Typically, the pH of the formulation will fall within the range of about 4 to about 9. If a base or alkaline buffering agent is present, the pH is typically toward the upper end of the range, such as about 6.5 to about 8. If the product is formulated without a pH adjuster or buffering agent, in certain embodiments, the pH will range from about 4.5 to about 6.5. A representative technique for determining the pH of a smokeless tobacco formulation involves dispersing 5 g of that formulation in 100 ml of high performance liquid chromatography water, and measuring the pH of the resulting suspension/solution (e.g., with a pH meter).

Certain representative smokeless tobacco compositions may incorporate about 0.05 to about 0.5 percent by weight of nicotine (e.g., tobacco-derived nicotine), about 55 to about 80 percent by weight of one or more sugar alcohols, about 1 weight percent to about 20 percent by weight of humectant (e.g., glycerin), about 15 to about 40 percent by weight of water, optionally about 0.001 to about 0.1 percent by weight of one or more sweeteners, one or more optional flavorants present in a total amount of up to about 2 percent, and optionally salt in an amount up to about 2 percent by weight, based on the total weight of the smokeless tobacco gel composition. For embodiments of the above composition having a more paste-like consistency, the humectant content is greater than about 7 weight percent, greater than about 8 weight percent, or greater than about 9 weight percent (e.g., about 7 to about 15 weight percent). For embodiments of the above composition having a more syrup-like consistency, the humectant content is less than about 6 weight percent, less than about 5 weight percent or less than about 4 weight percent (e.g., about 2 to about 6 weight percent). In certain embodiments of the above composition, the predominant sugar alcohol component is isomalt, typically in an amount of at least about 50% of the total dry weight of sugar alcohols, such as at least about 60%, or at least about 70%, or at least about 80% by dry weight. In certain embodiments, the one or more sugar alcohols will predominately include isomalt, in combination with one or more of maltitol, sorbitol, and erythritol.

Representative smokeless tobacco gel products according to the present invention can have various types of formats and configurations, and as a result, the character, nature, behavior, consistency, shape, form, size and weight of the composition can vary. The shape of a representative composition can be generally spherical, cylindrical (e.g., ranging form the general shape of a flattened disc to the general shape of a relatively long, slender stick), helical, obloid, square, rectangular, or the like; or the composition can have the form of a bead, capsule, film, strip, or the like. The shape of the composition can resemble a wide variety of pill, tablet, lozenge, capsule, and caplet types of products. According to one aspect, the smokeless tobacco gel product is preferably capable of lasting in the user's mouth for between about 1 and about 10 minutes until it completely dissolves. In smokeless tobacco gel products comprising an outer coating, this time refers to the time for both the coating and the gel composition contained therein to dissolve. Typically, the amount of time required for the coating to dissolve is less than that amount required for the gel composition to dissolve. For example, in certain coated products, the coating may dissolve in the user's mouth in between about 0.5 and about 5 minutes (e.g., between about 0.5 and about 2 minutes, such as about 1 minute) and the gel composition may dissolve in the user's mouth in between about 3 and about 10 minutes (e.g., between about 5 and about 8 minutes, such as about 7 minutes). Preferably, the products do not, to any substantial degree, leave any residue in the mouth of the user thereof, and do not impart a slick, waxy, or slimy sensation to the mouth of the user. Advantageously, the products can exhibit some type of gel, syrup, jelly-like, gelatin-like, taffy-like, or paste-like mouthfeel.

The visual appearance of the smokeless gel products provided herein can vary. In certain embodiments, the gel products can exhibit some degree of translucency (e.g., having a percent light transmittance of at least about 30% at visible light wavelengths greater than about 600 nm, or a percent light transmittance of at least about 40% at visible light wavelengths greater than about 600 nm, or a percent light transmittance of at least about 50% at visible light wavelengths greater than about 600 nm (or even higher levels such as greater than about 60% or greater than about 70% or greater than about 80% at visible light wavelengths greater than about 600 nm). Of course, it is understood that the translucent appearance of gels can be modified by addition of various ingredients directly to the gel and/or by the application of a coating thereto. For example, although a gel itself may exhibit some degree of translucency, in some embodiments, a coating may be provided with a coating that endows the overall product with a lesser degree of translucency (or even opacity).

The means by smokeless tobacco gel products can be produced can vary and generally, the components of the products can be combined by any means for providing such a formulation and/or product. Exemplary means for providing certain types of formulations are provided herein, although it is noted that other methods can be used without departing from the present invention. For example, the various components of the smokeless tobacco gel composition may be contacted, combined, or mixed together in conical-type blenders, mixing drums, ribbon blenders, or the like, such as a Hobart mixer. As such, the overall mixture of various components with the tobacco material may, in some embodiments, be relatively uniform in nature. See also, for example, the types of methodologies set forth in U.S. Pat. No. 4,148,325 to Solomon et al.; U.S. Pat. No. 6,510,855 to Korte et al.; and U.S. Pat. No. 6,834,654 to Williams, each of which is incorporated herein by reference.

Typical conditions associated with manufacture of food grade products such as described herein include control of heat and temperature (i.e., the degree of heat to which the various ingredients are exposed during manufacture and the temperature of the manufacturing environment), moisture content (e.g., the degree of moisture present within individual ingredients and within the final composition), humidity within the manufacturing environment, atmospheric control (e.g., nitrogen atmosphere), airflow experienced by the various ingredients during the manufacturing process, and other similar types of factors. Additionally, various process steps involved in product manufacture can involve selection of certain solvents and processing aids, use of heat and radiation, refrigeration and cryogenic conditions, ingredient mixing rates, and the like. The manufacturing conditions also can be controlled due to selection of the form of various ingredients (e.g., solid, liquid, or gas), particle size or crystalline nature of ingredients of solid form, concentration of ingredients in liquid form, or the like. Ingredients can be processed into the desired composition by techniques such as extrusion, compression, spraying, and the like.

In certain embodiments, it is preferred to maintain the composition after manufacture in an airtight and/or air-purged environment such that the product is not exposed to air to a significant degree. Exposure of the gels of the invention to air for an extended period will typically result in hardening of the gel into a form that does not have the desirable properties noted herein, such as flowability and physical characteristics similar to syrups, pastes, and the like. Accordingly, the method of storage of gels of the invention preferably includes steps taken to minimize interaction between air and the product, such as sealing the product in airtight packaging. However, the controlled introduction of a certain amount of air during manufacture can be advantageous to enhance certain desired properties in the final product. For example, stirring or agitating the composition during cooling can introduce a certain amount of air over a short period of time. Such an aeration step during cooling can lead to a product with more paste-like qualities.

In certain embodiments, the sugar alcohol or combination of sugar alcohols is first heated to an elevated temperature, typically at a temperature that leads to a melted form. In certain embodiments, the sugar alcohols are initially in a particulate or syrup form. This heating step will typically not entail heating to the "hard crack" stage for the particular sugar alcohol(s) involved. Instead, the heating will typically be in the heating stages referred to as "soft ball" or "hard ball" in the confectionary art. An exemplary temperature range for the heating step is about 115° C. to about 130° C. Other components are added at various temperatures, and the final composition is typically deposited (e.g., into molds or other containers) or otherwise processed (e.g., via extrusion) while still warm. The final composition is advantageously placed in an airtight and/or air-purged environment to prevent or reduce product hardening upon exposure to air. Some of the additional product components can be added at the maximum temperature of the heated sugar material. Others are heat-sensitive and can be added at cooler temperatures. For example, the product mixture can be cooled to below 100° C. to add nicotine, certain pH adjusting or buffering ingredients, colorants, flavorants, and the like. Once all ingredients are mixed into the product composition, the product can be cooled to room temperature and stored in an airtight container. For a more paste-like consistency, during cooling, the product mixture can be aerated through stirring/agitation of the mixture until the desired paste-like texture and properties are obtained. In certain embodiments, the product mixture can be aerated through stirring or agitation for about 20 minutes to about 40 minutes. Thereafter, the product can be stored in an airtight container. As used herein, "airtight" or "air-purged" in the context of the environment surrounding the product refers to an environment where interaction of the product with air is minimized such that the product does not harden into a solid form.

During final cooling of the product, the products of the invention can be shaped if desired. For example, such products can be extruded into desired shapes. Exemplary extrusion methods are described, for example, in U.S. Pat. No. 3,806,617 to Smylie et al. and U.S. Pat. No. 4,880,018 to Graves, Jr., et al., which are incorporated herein by reference. In some embodiments, various types of molding techniques (e.g., including but not limited to, starch molding or injection molding) can be used. In some embodiments, the compositions are deposited into molds, e.g., starch molds as used in starch molding processes for forming pastilles. Pastille production processes that can be used for the production of smokeless tobacco gel products according to the present disclosure are set forth in U.S. Pat. No. 4,725,440 to Ridgway et al and U.S. Pat. No. 6,077,524 to Bolder et al., which are incorporated by reference herein. Where the product is molded, other types of molds may be used in the process, such as, for example, starchless molds, plastic tray molds, metallic tray molds, neoprene tray molds, etc. Such molded compositions are generally removed from the mold prior to distribution.

In some embodiments, the compositions can be coated in order to facilitate portability of the smokeless tobacco gel products, to reduce unnecessary packaging, and/or to reduce exposure of the product to air. The term "coated" and "coating" as used herein means that the gel smokeless tobacco composition is partially or substantially encompassed by, or encased within, a coating. Typically, such coatings are edible. For example, a gel product as described herein can be contained within an edible pouch, such as described in US Pat Appl. Publ. No. 2006/0280777 to Schydlowsy, which is incorporated herein by reference. In certain embodiments, the outer coating can be in the form of the type of coating or outer covering used in single piece or two-piece capsules known in the art.

Outer coatings can also help to improve storage stability of the smokeless tobacco gel products of the present disclosure, as well as improve the packaging process by reducing friability and dusting. The method of application can vary and a coating can be applied, for example, by preparing the composition in the form of a sheet and enclosing a gel smokeless tobacco formulation such as those described herein between two said sheets or by dipping or spraying the coating composition onto the exterior of a gel smokeless tobacco formulation. Devices for providing outer coating layers to the products of the present disclosure include pan coaters and spray coaters, and particularly include the coating devices available as CompuLab 24, CompuLab 36, Accela-Cota 48 and Accela-Cota 60 from Thomas Engineering.

Edible coatings generally comprise ingredients that are safe for oral consumption, such as those previously described herein (e.g., sugar alcohols, binders, flavorants, sweeteners, salts, colorants, etc.). An edible coating can have various textures and can be, for example, a gel coating, a soft-shell coating, or a hard-shell coating. Coatings can be applied in a wide range of thicknesses.

In some embodiments, a gel or soft-shell coating is applied to a gel smokeless tobacco composition of the present disclosure to give a smokeless tobacco gel product. Again, the specific texture and characteristics of the coating can vary (e.g., from taffy-like to jelly-like to gelatin-like to paste-like). In some embodiments, a gel or soft-shell coating can be characterized as having some degree of chewiness, resilience, and/or bounce.

For example, in certain embodiment, an exemplary gel or soft-shell coating is applied which comprises one or more sugar alcohols (as described in greater detail above) and which can further comprise optional flavorants, colorants, salts, sweeteners, buffering agents, acidic components, and/or other components of the types set forth herein. The coating compositions may include a tobacco material (e.g., a tobacco extract). For example, in certain embodiments, such a coating can comprise at least about 90% by weight of one or more sugar alcohols, at least about 95% of one or more sugar alcohols, at least about 97% of one or more sugar alcohols, or at least about 98% of one or more sugar alcohols by dry weight. It is to be understood that the specific method by which a given composition is prepared can contribute to the final form and/or texture of the composition. For example, confectionary making principles can apply to compositions comprising a substantial amount of sugar alcohols, wherein it is understood that higher heating temperatures can lead to harder, more brittle compositions whereas lower heating temperatures can lead to softer compositions. In certain embodiments, the coating composition can be maintained in a softer form (i.e., as a gel or soft-shell coating) by combining the components of the coating composition such that the sugar alcohol component(s) are heated at a temperature below the hard crack stage of the sugar alcohol component(s), e.g., between the soft crack and hard crack stages, between the hard ball and hard crack stages, between the hard ball and soft crack stages, between the firm ball and hard crack stages, between the firm ball and soft crack stages, between the firm ball and hard ball stages, between the soft ball and hard crack stages, between the soft ball and soft crack stages, between the soft ball and hard ball stages, or between the soft ball and firm ball stages.

In other embodiments, a hard-shell coating is applied to a gel smokeless tobacco composition of the present disclosure to give a smokeless tobacco gel product. The method of preparation of such coatings can vary. In some embodiments, it is understood that compositions such as those described above can be employed, wherein the sugar alcohol(s) are heated at a higher temperature (e.g., at or above the hard crack stage) to provide the composition in a hard-shell form.

In some embodiments, a glazing or anti-sticking coating, such as, for example, CAPOL 410 (available from Centerchem, Inc.), may be applied to the smokeless tobacco gel composition to provide free-flowing properties. In some embodiments, an exemplary outer coating comprises one or more sugar alcohols (as described in greater detail above) and a film-forming polymer, such as a cellulosic polymer (e.g., carboxymethylcellulose or CMC). For example, such coatings can comprise, e.g., between about 70 and about 90 percent of one or more sugar alcohols by dry weight and between about 10 and about 30 percent of a film-forming polymer by dry weight. Such coatings can further comprise optional flavorants, colorants, salts, sweeteners, buffering agents, and/or other components of the types set forth herein. The coating compositions may include a tobacco material (e.g., a tobacco extract). Other exemplary film-forming polymers include cellulosic polymers such as methylcellulose, hydroxypropyl cellulose (HPC), hydroxypropyl methylcellulose (HPMC), hydroxyethyl cellulose, and carboxy methylcellulose. Other exemplary coating compositions and methods of application are described in U.S. Appl. Publ. Nos. 2012/0055494 to Hunt et al. and 2013/0206150 to Duggins et al., which are incorporated by reference herein.

Although the foregoing description focuses on compositions that are uniform throughout each product unit, products can also be formed with multiple different formulations having different properties in the same product unit. For example, two different compositions can be deposited in a single mold to product a layered product. Still further, two different compositions could be co-extruded to form a product with different characteristics across its cross-section. Such a process could be used to provide a product with two different compositions featuring different dissolution rates such that a first portion of the product dissolves at a first rate (e.g., a faster rate) and a second portion dissolves at a second, slower rate.

Products of the present disclosure may be packaged and stored in any suitable packaging. Where the gel products of the invention are packaged in individual product units, the gel products can be packaged in convenient handheld containers. See, for example, the various types of containers for smokeless types of products that are set forth in U.S. Pat. No. 7,014,039 to Henson et al.; U.S. Pat. No. 7,537,110 to Kutsch et al.; U.S. Pat. No. 7,584,843 to Kutsch et al.; U.S. Pat. No. D592,956 to Thiellier and U.S. Pat. No. D594,154 to Patel et al.; US Pat. Pub. Nos. 2008/0173317 to Robinson et al.; 2009/0014343 to Clark et al.; 2009/0014450 to Bjorkholm; 2009/0250360 to Bellamah et al.; 2009/0266837 to Gelardi et al.; 2009/0223989 to Gelardi; 2009/0230003 to Thiellier; 2010/0084424 to Gelardi; and 2010/0133140 to Bailey et al; 2010/0264157 to Bailey et al.; 2011/0168712 to Bailey et al.; and 2011/0204074 to Gelardi et al., which are incorporated herein by reference.

Figure 1:
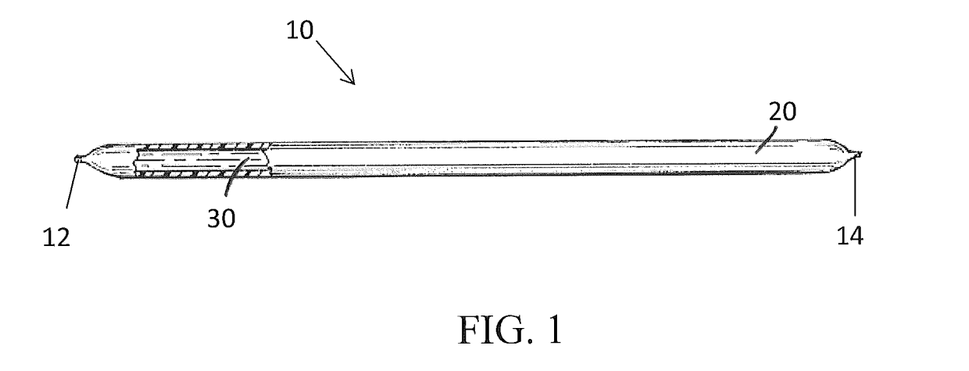
FIG. 1 is a side view of a packaged smokeless tobacco gel product with a cutaway portion showing the interior contents of the packaged product.

Typically, the gel products of the present invention are provided as a gel encased within a moisture and air barrier (e.g., a container/packaging or a coating). In some embodiments, the compositions can be deposited into containers for storage, distribution, and/or final use. The type of container used can vary and may be, for example, a cup, tub, pouch, or tube of varying size and shape. In some specific embodiments, the gel smokeless tobacco compositions can be provided within a straw-type structure (e.g., including but not limited to, a pouch-shaped or tubular-shaped structure, wherein the gel smokeless tobacco composition is contained within the open interior of the tubular structure). The ends of the non edible straw-type structure can be sealed or unsealed. Typically, the straw-type structure will be non-edible (e.g., constructed of a non-edible plastic material such as various thermoplastic polymers like polyethylene terephthalate, polyethylene, or polypropylene). Exemplary means for filling such containers are known and described, for example, in U.S. Pat. No. 4,939,884 to Peters and U.S. Pat. No. 7,047,709 to Hamilton, which are incorporated herein by reference. An exemplary gel product sealed in a straw-like outer casing is shown in FIG. 1. As shown, a product unit 10 can include a flowable gel composition 30 (e.g., a syrup or honey-like composition) positioned within a plastic straw or pouch 20. Certain examples of such product containers will include sealed ends, 12 and 14. Such ends may be heat-sealed such that one of the sealed ends will require opening (such as by cutting) in order to access the product. In other embodiments, the sealed ends may be in the form of recloseable seal, such as a zip lock enclosure.

Alternatively, the gel products of the invention can be positioned in a container that includes a movable element positioned to propel the contents of the container toward an open end from which the product can be dispensed, such as by manipulation of a wheel or ring element by the consumer. Such a container would be particularly useful for gels having a relatively high degree of rigidity and cohesiveness. Such a container can have a shape and/or functionality similar to those containers set forth in U.S. Pat. No. 4,605,330 to Crowley et al.; U.S. Pat. No. 4,932,803 to Goldberger et al.; U.S. Pat. No. 5,007,755 to Thompson; U.S. Pat. No. 7,105,173 to Rolling; U.S. Pat. No. 7,147,393 to Yoon; U.S. Pat. No. 8,136,686 to Schlatter; U.S. Pat. No. 8,292,532 to Nasu et al.; and U.S. Pat. No. 8,511,922 to Prischak, which are incorporated by reference herein. Certain containers can have the features of those types of containers that have been used commercially, for example, for those types of products that are characterized as lip balms, lipsticks, or glue products. For instance, representative containers that can be employed, or suitably modified, are those types of containers for lip balm products that have been marketed by Pfizer Consumer Healthcare, The Clorox Company and Neutrogena Corporation. Representative types of such containers also are available commercially from sources such as Rustic Escentuals, LLC.

Figure 2:
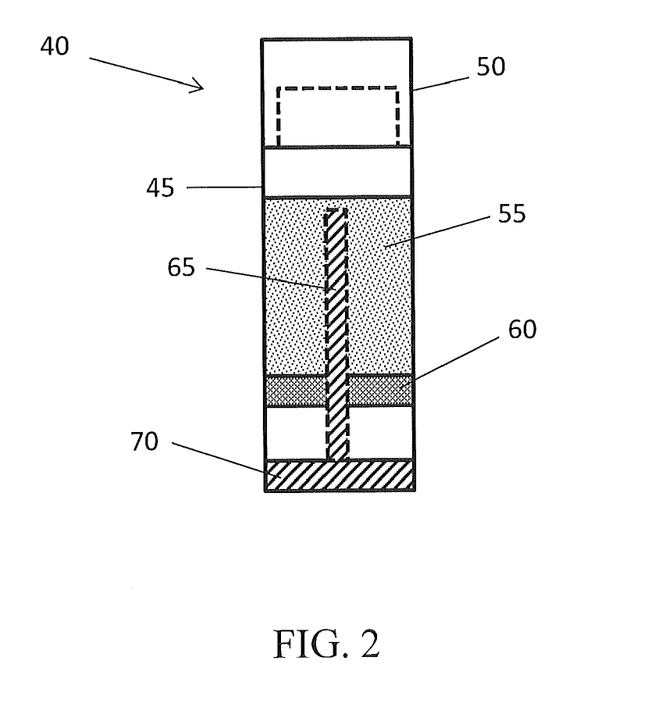
FIG. 2 is a side view of a further embodiment of a packaged smokeless tobacco gel product comprising a dispensing container.

An exemplary dispensing container is shown in FIG. 2, wherein the dispensing container 40 includes a container body 45 and a cap 50, which is shown attached to the container body and obscuring view of top lip surrounding the dispensing aperture of the container body (shown in dotted line in the figure). The container body 45 is shown as transparent for purposes of illustrating the invention. Within the container body 45 is a gel composition 55 (e.g., a paste-like composition) of the type set forth in the present invention. The dispensing container 40 further comprises a rotatable wheel 70 attached to a threaded post 65 such that the post rotates with the wheel. A non-rotatable movable floor 60 is in threaded engagement with the post 65 such that rotation of the wheel 70 (and post) will cause the floor to move within the container. In this manner, the floor 60 can push the column of gel composition 55 toward the dispensing aperture of the container body 45 when the wheel 70 is manipulated by the consumer. Once a desired portion of the gel composition 55 has been exposed from the dispensing aperture, the consumer can break off or bite the exposed portion for oral use.

EXPERIMENTAL

Aspects of the present invention is more fully illustrated by the following examples, which are set forth to illustrate certain aspects of the present invention and are not to be construed as limiting thereof.

Example 1

Paste-Like Gel Containing Nicotine

Isomalt, maltitol, and erythritol (all in syrup form), as well as sucralose are combined and heated to 260° F. (about 127° C.). The mixture is held at 260° F. (about 127° C.) and salt, glycerin, and water are combined and added to the mixture. Addition of these ingredients causes cooling of the mixture, so the resulting mixture is heated back to 220-225° F. (about 104-107° C.), cooled below 200° F. (about 93° C.), and citric acid, color, flavor, and nicotine are added. The amounts of each ingredient are set forth in Table 1 below.

TABLE 1

| Ingredient | Grams |
| --- | --- |
| Isomalt | 43.69 |
| Maltitol | 16.94 |
| Erythritol | 7.33 |
| Sucralose | 0.002 |
| Salt | 0.23 |
| Glycerin | 9.80 |
| Water | 20.36 |
| Citric acid | 0.03 |
| Color | Minimal (1 drop) |
| Flavor | 0.10 |
| 7.5% Nicotine in aqueous solution/97% purity | 1.50 |

The resulting paste mixture is stirred well to aerate the mixture until the color of the paste mixture is uniform, then cooled to 80° F. (about 27° C.) and deposited into airtight containers. The containers are left open until a paste-like consistency is obtained and are stirred periodically to provide uniform texture. Once the desired consistency is obtained, the containers are sealed air-tight to prevent hardening. The final water content is higher than indicated in Table 1 as moisture is present in the other ingredients, particularly the sugar alcohol syrups. Total water content is maintained less than about 40% by weight.

Example 2

Syrup-Like Gel Containing Nicotine

Isomalt, maltitol, and erythritol (all in syrup form), as well as sucralose and salt are combined and heated to 260° F. (about 127° C.) with stirring to ensure complete dissolution of all solids. The mixture is cooled to 250° F. (about 121° C.), glycerin and water are combined and added to the mixture, and the mixture is stirred well. The resulting mixture is heated back to 220-225° F. (about 104-107° C.), cooled to between 180° F. and 200° F. (about 82-93° C.), and citric acid, color, flavor, and nicotine are added. The amounts of each ingredient are set forth in Table 2 below.

TABLE 2

| Ingredient | Grams |
| --- | --- |
| Isomalt | 56.00 |
| Maltitol | 16.70 |
| Erythritol | 9.30 |
| Sucralose | 0.02 |
| Salt | 0.34 |
| Glycerin | 5.00 |
| Water | 11.00 |
| Citric acid | 0.04 |
| Color | Minimal (1 drop) |

TABLE 2-continued

| Ingredient | Grams |
| --- | --- |
| Flavor | 0.10 |
| 7.5% Nicotine in aqueous solution/97% purity | 1.50 |

The resulting gel mixture is stirred well until the color of the gel mixture is uniform, then deposited into containers while still warm. The containers are sealed air-tight to prevent hardening. The final water content is higher than indicated in Table 2 as moisture is present in the other ingredients, particularly the sugar alcohol syrups. Total water content is maintained less than about 40% by weight. The resulting product has a honey-like syrup consistency.

Example 3

Paste-Like Gel Containing Particulate Tobacco

A paste-like gel is prepared in accordance with Example 1 except the nicotine solution is replaced with 10 grams of micro-milled tobacco material and the erythritol is removed.

Example 4

Paste-Like Gel Containing Tobacco Extract

A paste-like gel is prepared in accordance with Example 1 except the nicotine solution is replaced with 5 grams of freeze-dried tobacco extract and the erythritol is removed.

Example 5

Syrup-Like Gel Containing Tobacco Extract

A syrup-like gel is prepared in accordance with Example 2 except the nicotine solution is replaced with 5 grams of freeze-dried tobacco extract and the erythritol is removed.

Example 6

Syrup-Like Gel Containing Particulate Tobacco

A syrup-like gel is prepared in accordance with Example 2 except the nicotine solution is replaced with 10 grams of micro-milled tobacco material and the erythritol is removed.

Example 7

Coating for Gels

Warm water (100 g) is placed on a hot plate, and NaOH is added and mixed to dissolve. Tobacco extract is added and mixed to dissolve. CMC 15 is added, mixed to dissolve and the mixture is heated to about 135° F. (about 57° C.). Sorbitol, isomalt, maltitol syrup, and sucralose are separately combined, melted to liquid form at a temperature of 290-300° F. (about 143-149° C.), cooled to about 275° F. (135° C.), and added to the mixture. The resulting combination is stirred using a hand-held mixer on low speed to limit air entrainment. Flavor is added to the combination. The amounts of each ingredient are set forth in Table 3 below.

TABLE 3

| Ingredient | Grams (dry weight) | Percent solids (%) |
| --- | --- | --- |
| Tobacco Extract | 5.74 | 100 |
| CMC 15 | 15.0 | 100 |
| Maltitol syrup | 11.9 | 70 |
| Sorbitol powder | 14.3 | 98.5 |
| Isomalt crystals | 52.0 | 96 |
| Sodium carbonate | 0.31 | 99 |
| Sucralose | 0.3 | 100 |
| Flavor | 0.5 | 100 |

The resulting coating can be applied to the gels of the invention in various ways. If the desired product is a sheet, the coating material can be cast into sheets on stainless steel plates using a casting knife to form outer layers surrounding a gel layer. If the desired product is a spray coating, the mixture is maintained at an elevated temperature (>150° F. (about 66° C.)) and used in a sprayer, while limiting air intake into the mixture.

Example 8

Taffy-Like Coating

Isomalt, maltitol, vanillin, sucralose, and salt are combined and heated to 240° F. (about 116° C.) with stirring to ensure complete dissolution of all solids. The mixture is cooled to 200° F. (about 93° C.), and citric acid, color, flavor, and nicotine are added. The amounts of each ingredient are set forth in Table 4 below.

TABLE 4

| Ingredient | Grams |
| --- | --- |
| Isomalt | 66.26 |
| Maltitol | 32.26 |
| Vanillin | 0.10 |
| Sucralose | 0.02 |
| Salt | 0.23 |
| Citric acid | 0.03 |
| Color | Minimal (1 drop) |
| Flavor | 0.10 |
| 7.5% Nicotine in aqueous solution/97% purity | 1.00 |

The resulting mixture is stirred well and then deposited onto parchment. Once the deposited material is cooled but still warm, it is rolled or pressed into sheets.

To apply this coating, a gel of the invention is deposited onto one sheet of the coating formulation, a second sheet of the coating formulation is placed on top, and the sides are tightened. Thereafter, the multi-layer product can be placed in a drop roller to form individual product units.

Example 9

Hard-Dissolve Coating

Isomalt, maltitol, vanillin, sucralose, and salt are combined and heated to 240° F. (about 116° C.) with stirring to ensure complete dissolution of all solids. The mixture is cooled to 200° F. (about 93° C.), and citric acid, color, flavor, and nicotine are added. The amounts of each ingredient are set forth in Table 5 below.

TABLE 5

| Ingredient | Grams |
| --- | --- |
| Isomalt | 66.26 |
| Maltitol | 32.26 |
| Vanillin | 0.10 |
| Sucralose | 0.02 |
| Salt | 0.23 |
| Citric acid | 0.03 |
| Color | Minimal (1 drop) |
| Flavor | 0.10 |
| 7.5% Nicotine in aqueous solution/97% purity | 1.00 |

The resulting mixture is stirred well and then deposited onto parchment. Once the deposited material is cooled but still warm, it is rolled or pressed into sheets.

To apply this coating, a gel of the invention is deposited onto one sheet of the coating formulation, a second sheet of the coating formulation is placed on top, and the sides are tightened. Thereafter, the multi-layer product can be placed in a drop roller to form individual product units.

Example 10

Hard Shell Coating

Isomalt, maltitol, vanillin, sucralose, and salt are combined and heated to 240° F. (about 116° C.) with stirring to ensure complete dissolution of all solids. The mixture is cooled to 200° F. (about 93° C.), and are added. The amounts of each ingredient are set forth in Table 6 below.

TABLE 6

| Ingredient | Grams |
| --- | --- |
| Isomalt | 66.26 |
| Maltitol | 32.26 |
| Vanillin | 0.10 |
| Sucralose | 0.02 |
| Salt | 0.23 |

The resulting mixture is stirred well and then deposited onto parchment. Once the deposited material is cooled but still warm, it is rolled or pressed into sheets.

To apply the coating formulation, a gel of the invention is deposited onto one sheet of the coating formulation, a second sheet of the coating formulation is placed on top, and the sides are tightened. Thereafter, the multi-layer product can be placed in a drop roller to form individual product units.

Many modifications and other embodiments of the invention will come to mind to one skilled in the art to which this invention pertains having the benefit of the teachings presented in the foregoing description; and it will be apparent to those skilled in the art that variations and modifications of the present invention can be made without departing from the scope or spirit of the invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A smokeless tobacco gel product comprising:
   a) a tobacco material in an amount of at least about 0.01 weight percent, based on the total weight of the smokeless tobacco gel product;
   b) at least about 60 percent by weight of one or more sugar alcohols, wherein the one or more sugar alcohols are predominantly isomalt;
   c) a humectant in an amount of at least about 0.1 weight percent; and
   d) water in an amount of at least about 14 weight percent.

2. The smokeless tobacco gel product of claim 1, wherein the tobacco material is present in an amount of about 0.1 to about 10 weight percent.

3. The smokeless tobacco gel product of claim 1, wherein the tobacco material comprises particulate tobacco.

4. The smokeless tobacco gel product of claim 1, wherein the tobacco material comprises a tobacco extract.

5. The smokeless tobacco gel product of claim 4, wherein the tobacco material comprises tobacco-derived nicotine.

6. The smokeless tobacco gel product of claim 1, comprising at least about 65 percent by weight of the one or more sugar alcohols.

7. The smokeless tobacco gel product of claim 1, wherein the one or more sugar alcohols comprise, in addition to isomalt, one or more sugar alcohols selected from the group consisting of erythritol, threitol, arabitol, xylitol, ribotol, mannitol, sorbitol, dulcitol, iditol, maltitol, lactitol, polyglycitol, and combinations thereof.

8. The smokeless tobacco gel product of claim 1, wherein the one or more sugar alcohols comprise, in addition to isomalt, one or more sugar alcohols selected from the group consisting of maltitol, xylitol, sorbitol, erythritol, and combinations thereof.

9. The smokeless tobacco gel product of claim 1, wherein the isomalt comprises at least about 60% of the total dry weight of sugar alcohols.

10. The smokeless tobacco gel product of claim 1, comprising at least about 1.0 weight percent of humectant.

11. The smokeless tobacco gel product of claim 1, wherein the humectant is present in an amount of at least about 7 weight percent, and the smokeless tobacco gel has a paste-like consistency.

12. The smokeless tobacco gel product of claim 1, wherein the humectant is present in an amount of less than about 6 weight percent, and the smokeless tobacco gel has a syrup consistency.

13. The smokeless tobacco gel product of claim 1, wherein the humectant comprises glycerin.

14. The smokeless tobacco gel product of claim 1, comprising about 15 to about 40 weight percent water.

15. The smokeless tobacco gel product of claim 1, wherein the product further comprises one or more ingredients selected from the group consisting of sweeteners, salts, buffering agents, pH adjusters, colorants, flavorants, and combinations thereof.

16. The smokeless tobacco gel product of claim 1, wherein the product is translucent.

17. The smokeless tobacco gel product of claim 1, wherein the product exhibits a syrup-like, jelly-like, gelatin-like, paste-like, or taffy-like texture.

18. The smokeless tobacco gel product of claim 1, wherein the product exhibits a residence time in a user's mouth of between about 1 and about 10 minutes before complete dissolution of the product.

19. The smokeless tobacco gel product of claim 1, further comprising an edible coating.

20. The smokeless tobacco gel product of claim 19, wherein the edible coating comprises a soft-shell coating, gel coating, or hard-shell coating.

21. The smokeless tobacco gel product of claim 19, wherein the edible coating comprises a second tobacco material.

22. The smokeless tobacco gel product of claim 1, comprising about 0.05 to about 0.5 percent by weight of nicotine; about 60 to about 80 percent by weight of one or more sugar alcohols; about 1 weight percent to about 20 percent by weight of a humectant; and about 15 to about 40 percent by weight of water.

23. The smokeless tobacco gel product of claim 22, further comprising one or more of the following: (a) about 0.001 to about 0.1 percent by weight of one or more sweeteners; (b) up to about 2 percent of one or more flavorants; and (c) up to about 2 percent by weight of a salt.

24. The smokeless tobacco gel product of claim 22, wherein the humectant is present in an amount of at least about 7 weight percent, and the smokeless tobacco gel has a paste-like consistency.

25. The smokeless tobacco gel product of claim 22, wherein the humectant is present in an amount of less than about 6 weight percent, and the smokeless tobacco gel has a syrup consistency.

26. A method of preparing the smokeless tobacco gel product of claim 1, comprising:
  (i) mixing the one or more sugar alcohols with the humectant the tobacco material and the water to form a gel mixture; and
  (ii) depositing the gel mixture into an airtight container or encapsulating the gel mixture with a coating composition to prevent hardening of the gel mixture in the presence of air.

27. The method of claim 26, further comprising applying heat during the mixing step at a temperature below the hard crack stage of the one or more sugar alcohols.

28. The method of claim 26, wherein the encapsulating step comprises (a) dipping the gel mixture in a coating composition; (b) spraying a coating composition onto the gel mixture; or (c) preparing a coating composition in the form of a sheet and enclosing the gel mixture between two sheets of the coating composition.

29. The method of claim 26, wherein the step of depositing the gel mixture into an airtight container comprises depositing the gel mixture into a container comprising a dispensing mechanism adapted for urging the gel mixture toward an opening when manipulated by a consumer.

30. The method of claim 26, wherein the step of depositing the gel mixture into an airtight container comprises depositing the gel mixture into an air-impermeable pouch or straw, the pouch or straw including at least one heat-sealed or recloseable end.

31. The method of claim 26, wherein said mixing step further comprises mixing into the gel mixture one or more ingredients selected from the group consisting of sweeteners, salts, buffering agents, pH adjusters, colorants, flavorants, and combinations thereof.

32. The method of claim 26, further comprising the step of aerating the gel mixture to impart a paste-like texture to the gel mixture.

33. A smokeless tobacco gel product comprising:
  a) a tobacco material in an amount of at least about 0.01 weight percent, based on the total weight of the smokeless tobacco gel product;
  b) at least about 50 percent by weight of one or more sugar alcohols, wherein the one or more sugar alcohols are predominantly isomalt;
  c) humectant in an amount i) of at least about 7 weight percent, wherein the smokeless tobacco gel has a paste-like consistency or ii) in an amount of at least about 0.1 weight percent but less than about 6 weight percent, wherein the product has a syrup-like consistency; and
  d) water in an amount of at least about 14 weight percent.

34. A smokeless tobacco gel product comprising:
  a) a tobacco material in an amount of about 0.1 to about 10 weight percent, based on the total weight of the smokeless tobacco gel product;
  b) at least about 50 percent by weight of one or more sugar alcohols, wherein the one or more sugar alcohols are predominantly isomalt;
  c) a humectant in an amount of at least about 0.1 weight percent; and
  d) water in an amount of at least about 14 weight percent.

35. A smokeless tobacco gel product comprising:
  a) a particulate tobacco material in an amount of about 0.1 to about 10 weight percent, based on the total weight of the smokeless tobacco gel product;
  b) at least about 50 percent by weight of one or more sugar alcohols;
  c) a humectant in an amount of at least about 0.1 weight percent; and
  d) water in an amount of at least about 14 weight percent.

36. A smokeless tobacco gel product comprising:
  a) a particulate tobacco material in an amount of at least about 0.01 weight percent, based on the total weight of the smokeless tobacco gel product;
  b) at least about 60 percent by weight of one or more sugar alcohols;
  c) a humectant in an amount of at least about 0.1 weight percent; and
  d) water in an amount of at least about 14 weight percent.

* * * * *